Feb. 26, 1963   F. A. SIMMONS   3,078,652
BROOM-RAKE
Filed Sept. 1, 1961
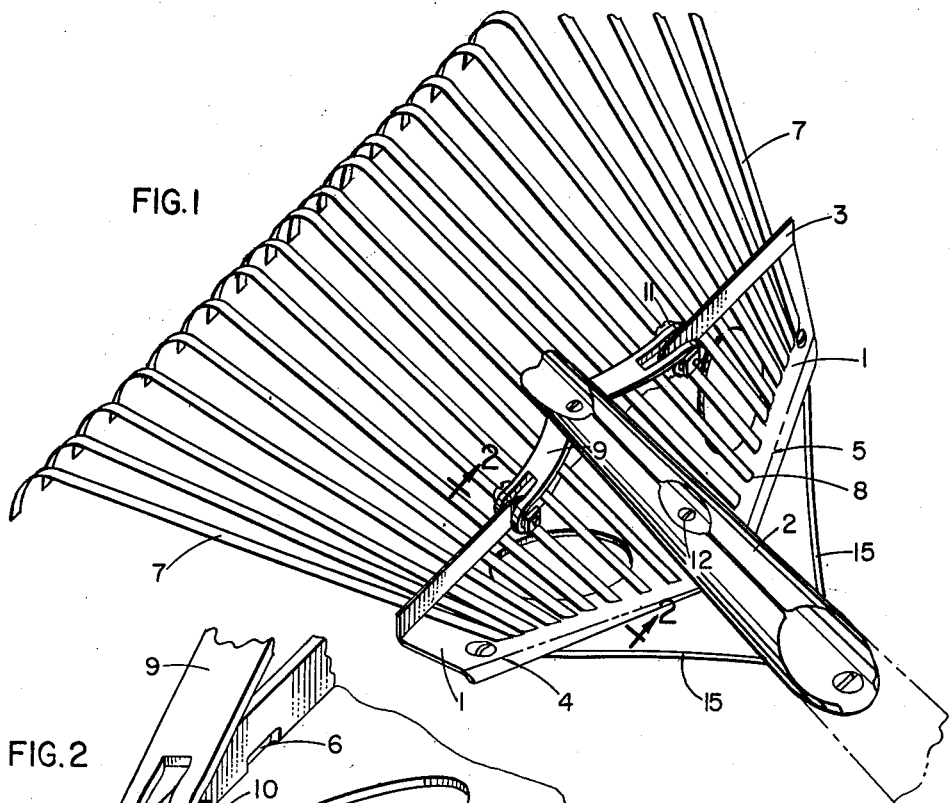
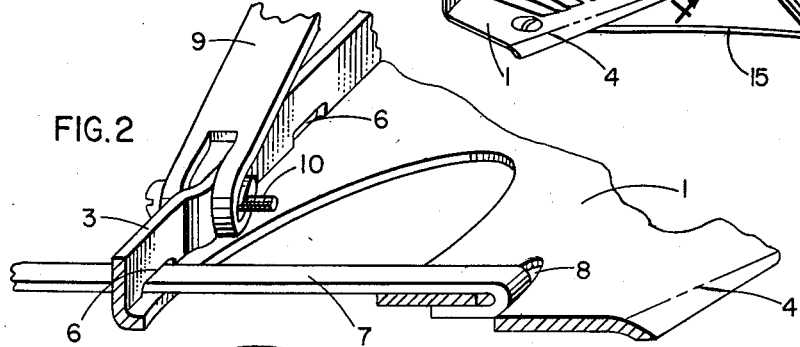
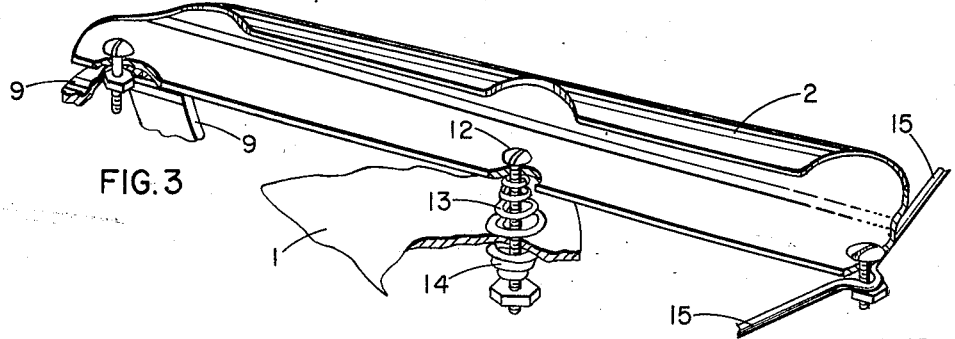
INVENTOR
FRED A. SIMMONS
BY *Milburn & Milburn*
ATTORNEYS

United States Patent Office 3,078,652
Patented Feb. 26, 1963

3,078,652
BROOM-RAKE
Fred A. Simmons, Washington, D.C., assignor to Simmons Tool Company, Inc., Washington, D.C., a corporation of the District of Columbia
Filed Sept. 1, 1961, Ser. No. 135,557
1 Claim. (Cl. 56—400.17)

This invention is for an improved broom-rake.

One object is to devise a broom-rake of sturdy and durable construction and yet comparatively simple and inexpensive.

Another object is to devise a broom-rake that can be conveniently made of different sizes and in which the method of making the different sizes is greatly simplified.

More specifically, it is an object to devise a broom-rake with a bridle member of such general form as will simplify the required operation in the assembly of each one of the different sizes.

Other objects will appear from the following description and claim when considered together with the accompanying drawing.

FIG. 1 is a perspective view of my new broom-rake;

FIG. 2 is an enlarged view corresponding to line 2—2 of FIG. 1;

FIG. 3 is an enlarged sectional view through the ferrule to show the details thereof.

Referring now to the accompanying drawing in detail, there is required only a single substantially flat rigid metallic bridle member 1, that extends transversely of the length of the handle ferrule 2 and has a straight integral edge 3 arranged towards the front of the rake while its integral side edges 4 and 5 extend rearwardly and inwardly towards the ferrule 2. The bridle member may be provided with cut-out portions, as indicated in the drawing, so as to lighten its weight and also for the purpose of appearance.

The front base edge 3 of the bridle member 1 is bent towards the ferrule 2 so as to provide a flange substantially normal to the body of the bridle member 1. The bottom of the flanged edge portion 3 is provided with a plurality of suitably spaced holes 6 of appropriate size and shape for snug passage of the tines 7 therethrough; and along the two side edges 4 and 5 of the bridle member there are a corresponding number and arrangement of holes 8 through which the rear ends of the tines 7 of spring metal are extended and bent over forwardly into flat engagement with the opposite face of the bridle member. That is, the rear parts of the flat tines 7 have contactual engagement along the face of the bridle member towards the ferrule 2 and their rear ends are flattened against the other face of the bridle member.

I will explain that, in order to make my broom-rake of different sizes, the bridle members are first stamped out of sturdy sheet metal so as to all have the same width but different lengths according to the number of tines for the different sizes of the rakes. The edge portion 3 is flanged and the holes 6 and 8 are formed as part of the same stamping operation. Then, after passing the tines 7 through the holes 6, the ends of the tines will be secured in the holes 8; and the same dies can be used in this operation for all sizes of bridles and hence for all sizes of my rakes by virtue of the form of bridle that is provided in my present invention. That is, the bridle is of the same form and the holes 6 and 8 are located in the same relative position for all sizes of rakes, the only difference being in the lentgh of the bridle member which of course is determined by the number of tines desired in any case. When the tines are attached to the bridle member in this manner, they virtually become an integral part of the same, with very marked resultant sturdiness and durability.

It is to be noted also that the tines are arranged in fan-like fashion with their forward, free, curved ends in a substantially straight line so as to cover the raked area most efficiently, the holes 6 and 8 being properly positioned and spaced for this purpose; and, with my substantially isosceles triangular form of bridle member and with the rear ends of the tines secured along lines substantially parallel to the rear edges of the bridle member, the tines of equal length will assume such desired arrangement for this type of rake, as above referred to and as illustrated in the accompanying drawing. There is thus realized a corresponding saving in metal required in the bridle member as compared with other possible forms.

The arched rigid connecting member 9 has its two ends split so as to straddle the flanged edge 3 of the bridle member and is bolted thereto, as indicated by reference numerals 10 and 11; while the middle point of the member 9 is bolted to the forward cut-out end portion of the ferrule 2. A bolt 12 extends through the bridle member at a point corresponding approximately to its apex and into the ferrule 2 which is cut out so as to permit application of this bolt; and coil springs 13 and 14 surround this bolt, upon opposite sides of the bridle member, and have abutment against the ferrule and the nut and head of the bolt, respectively. The purpose of this arrangement is to provide a resilient action between the rake head (the bridle and tines) and the handle which is inserted within the ferrule 2, as indicated in the drawing.

The rear end of the ferrule 2 is cut away so as to permit attachment of the looped middle part of the rigid wire or rod 15 which has its ends secured to the ends of the bridle member near the edge thereof, screw bolts being used for this purpose.

Using this rake in the usual manner, with pressure applied to the handle and ferrule, there will be permitted a spring action between the handle means and the rake head, such movement being about the point 12 as a center. That is, the springs 13 and 14 will permit such relative movement and will ensure return of the parts to neutral position upon release of such pressure, with resultant increased efficiency in the raking action.

Thus I have devised a broom-rake that is of very sturdy construction and hence is capable of long life of usefulness and yet, by virtue of the comparatively simple and few parts that can be assembled in a convenient manner, this rake can be manufactured and sold at a reasonable price.

Other practical advantages, flowing from this invention, will no doubt readily suggest themselves to those who are familiar with the art to which it relates; and it is to be understood that the present form of disclosure is merely for the purpose of illustration and that there might be devised various modifications thereof without departing from the spirit of my invention as herein set forth and claimed.

What I claim is:

A broom-rake comprising a hollow handle-holding means, a single one-piece rigid flat bridle member spaced from said handle-holding means and transversely disposed with respect to the length thereof and with an integral front portion arranged forwardly and extending transversely of the length of said handle-holding means and with integral rear edges extending rearwardly and angularly towards said handle-holding means, the rearward-forward dimension of said bridle member decreasing from its middle towards its two ends, the front edge portion of said bridle member being bent in the form of a flange extending towards said handle-holding means and having spaced holes through the base of said flanged portion and correspondingly spaced holes along lines substantially parallel to the rear edges of said bridle member, a plurality of tines of substantially equal length in fan-like arrangement extending through said flange holes and having their rear portions in continuous contactual engagement along the face of said bridle member and having their rear ends extended through and secured within said rear holes of said bridle member and along lines substantially parallel to the rear edges thereof, and an arched rigid connecting member transversely disposed with respect to the length of said handle-holding means and secured at its two ends to spaced points of said flanged portion of said bridle member and at its middle to the forward end of said handle-holding means.

References Cited in the file of this patent
UNITED STATES PATENTS

| | | |
|---|---|---|
| 2,205,827 | Brooke | June 25, 1940 |
| 2,622,387 | Brooke | Dec. 23, 1952 |
| 2,672,006 | Melvin | Mar. 16, 1954 |